United States Patent [19]

Theodore et al.

[11] Patent Number: 4,528,863
[45] Date of Patent: Jul. 16, 1985

[54] ISOLATION PACKAGE FOR TRANSMISSION SHIFT LEVER

[75] Inventors: Chris P. Theodore, Whitmore Lake, Mich.; Ronald E. Watson, Lansdale, Pa.

[73] Assignee: Cars & Concepts, Inc., Brighton, Mich.

[21] Appl. No.: 546,329

[22] Filed: Oct. 28, 1983

[51] Int. Cl.³ ............................................. B60K 20/00
[52] U.S. Cl. ..................... 74/473 R; 74/491
[58] Field of Search ............. 74/473 R, 491, 523; 248/610, 611

[56] References Cited

U.S. PATENT DOCUMENTS

| | | | |
|---|---|---|---|
| 3,269,208 | 8/1966 | Whitchurch | 74/473 R |
| 3,657,943 | 4/1972 | Bruhn, Jr. et al. | 74/473 R |
| 4,266,438 | 5/1981 | Kessmar | 74/473 R |
| 4,492,129 | 1/1985 | Hasegawa | 74/473 R |

Primary Examiner—Stephen F. Husar
Attorney, Agent, or Firm—Brooks & Kushman

[57] ABSTRACT

An isolation package (22) provides connection of a transmission shift lever (14) with a shifter operating member (16). A connector (28) of the isolation package (22) has a threaded connection (30,32) with an upper end (18) of the shifter operating member (16) and extends through a hole (34) in the lower end (20) of the lever. Elastomeric material (36,38) is positioned between the lever end (20) and the end (18) of the shifter operating member (16) to provide a vibration isolated connection. The preferred construction of the isolation package (22) includes an elastomeric sleeve (36) and a pair of elastomeric tubes (38) that cooperate with a pair of the connectors (28) to provide the vibration isolated connection. A clamping plate (50) engages the elastomeric sleeve (36) to limit deformation thereof and thereby rigidify the connection.

10 Claims, 2 Drawing Figures

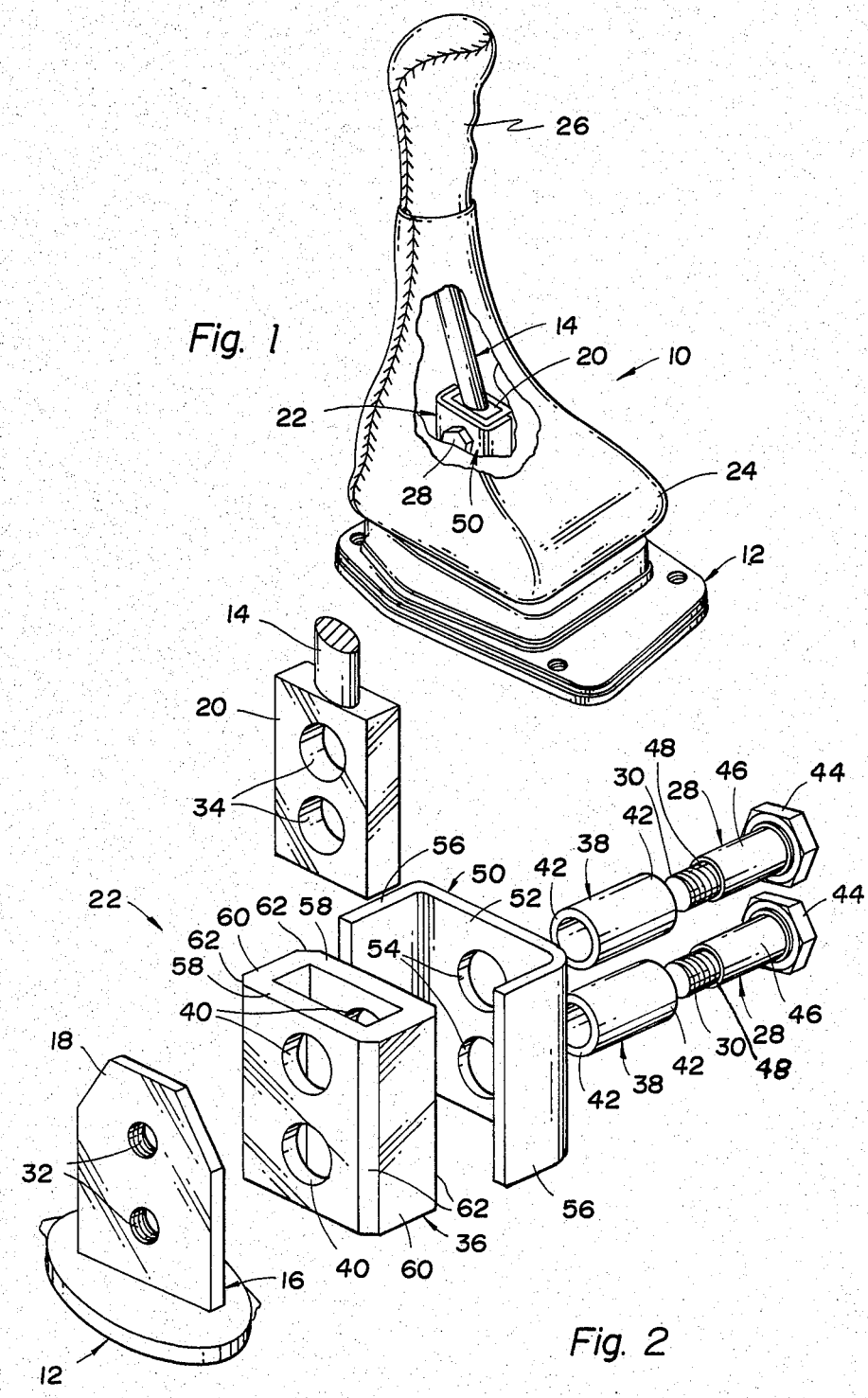

ISOLATION PACKAGE FOR TRANSMISSION SHIFT LEVER

TECHNICAL FIELD

This invention relates to an improved isolation package for connecting a lever and a shifter operating member of a transmission shifter assembly.

BACKGROUND ART

Transmission shifter assemblies conventionally include a shifter and a lever for operating the shifter by manual movement. The shifter normally includes an operating member having a lower end that shifts an associated transmission and having an upwardly projecting upper end at which a lower end of the lever is connected.

U.S. Pat. No. 3,647,943 discloses a sound insulating coupling for connecting a transmission shifter lever and operating member. This coupling includes male and female portions that are axially interengaged with each other with interposed rubber cushions to connect the shifter operating member and the lever in a manner which limits the transmission of noise and vibration. A snap action securement of a retaining jacket that receives the rubber cushion secures the male and female portions of the coupling to each other against axial movement that would disengage the lever from the operating member.

DISCLOSURE OF THE INVENTION

An object of the present invention is to provide an improved isolation package for a transmission shifter assembly in order to connect an operating member of a shifter and a lever that operates the shifter by manual actuation. This isolation package connects a lower end of the lever and an upper end of the operating member which controls shifting of an associated transmission. The isolation package isolates the lever from noise and vibration generated by the transmission.

The improved isolation package of the invention includes a connector that extends between the lower end of the lever and the upper end of the shifter operating member and has a connection to one of these ends. The other end includes a hole through which the connector extends to secure the lever and the operating member ends to each other. Elastomeric material is positioned between the lever and operating member ends and between the connector and the other end within the hole to provide a vibration isolated connection between the operating member and lever ends.

In the preferred construction, the elastomeric material includes an elastomeric sleeve that receives the other end having the hole through which the connector extends, and the sleeve has holes aligned with the hole in the other end such that the connector can extend through the sleeve. The elastomeric material also includes a tube that extends through the holes in the sleeve and the other end with the connector extending through the tube to connect the ends to each other in a vibration isolating manner. Opposite ends of the elastomeric tube are preferably respectively received within the holes in the elastomeric sleeve.

The connector preferably includes a threaded end for providing the connection thereof to the one end in a threaded manner. A head of the connector and its threaded end are positioned on opposite sides of the elastomeric tube through which the connector extends. The connector has a shank that extends between its head and threaded end through the elastomeric tube.

A clamping plate of the isolation package includes a clamping portion located between the connector head and the elastomeric sleeve to limit deformation thereof and thereby provide a more rigid connection. This clamping plate includes a pair of spaced flanges extending from the plate portion thereof in a perpendicular relationship to engage the elastomeric sleeve and limit deformation thereof as force is carried between the lever and the operating member.

In the most preferred construction, a pair of the connectors and a pair of the elastomeric tubes connect the shifter operating member and lever ends in cooperation with the elastomeric sleeve and the clamping plate. As disclosed, the end of the shifter operating member has threaded holes for providing the threaded connections of the threaded ends of the pair of connectors thereto, and the lever end includes the holes through which the pair of connector shanks extend between their heads and threaded connections.

The objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a perspective view of a transmission shifter assembly partially broken away to illustrate an isolation package constructed in accordance with the present invention; and FIG. 2 is an exploded perspective view illustrating the isolation package of the invention.

BEST MODE FOR CARRYING OUT THE INVENTION

With reference to FIG. 1 of the drawings a transmission shifter assembly 10 incorporating the invention includes a shifter 12 and a lever 14 for operating the shifter. The shifter 12 includes an operating member 16 shown in FIG. 2. This shifter operating member 16 has an unshown lower end that controls shifting of an associated transmission and has an upwardly projecting upper end 18. Lever 14 has a lower end 20 for moving the upper end 18 of the operating member of the shifter.

An isolation package 22 constructed in accordance with the present invention connects the upper end 18 of the shifter operating member 16 and the lower end 20 of the lever 14 in a manner that isolates the lever from transmission vibration and noise. Shifter 12 is covered by a flexible boot 24 which also encloses the isolation package 22 at the lower lever end 20. An upper end of lever 14 supports a manual knob 26 that permits movement of the lever for actuating movement of the shifter operating member 16 through the connection provided by the isolation package 22.

As best illustrated in FIG. 2, isolation package 22 includes at least one connector 28 and preferably includes a pair of such connectors in order to prevent twisting between the lever 14 and operating member 16. Each of the connectors has an end 30 that is threaded into an associated threaded hole 32 in the upper end 18 of operating member 16 to provide a threaded connection to the operating member. Each connector 28 extends through an associated hole 34 in the lower end 20 of the shifter lever 14 to secure the lever end and the operating member end to each other. As is hereinafter more fully described, elastomeric material preferably embodied by a sleeve 36 and a pair of tubes 38 is positioned between the lever end 20 and the operating member end 18 and between each connector 28 and the lever end 20 within the associated hole 34 to provide a vibration isolated connection between the operating member end 18 and the lever end 20.

It should be noted that it is possible to reverse the ends 18 and 20 such that each connector 28 extends through an associated hole in the upper end 18 of operating member 16 and has a threaded connection to the lever end 20. However, the construction illustrated is preferred since the lever 14 is much more readily handled for insertion into the elastomeric sleeve prior to assembly than is the operating member 16 of the shifter 12.

Upon assembly, the lever end 20 is inserted into the elastomeric sleeve 36 such that a pair of holes 40 in the sleeve are aligned with each hole 34 in the lever end 20. Each elastomeric tube 38 extends through the associated lever end hole 34 with the associated connector 28 extending through the tube to connect the lever end 20 to the operating member end 18 as the connector end 30 is threaded into the associated hole 32. Elastomeric tubes 38 preferably each have opposite ends 42 which are respectively received within the associated pair of holes 40 in the elastomeric sleeve 36 upon assembly.

Each connector 28 includes a head 44 that is located on the opposite side of the lever end 20 from the threaded end 30 thereof that provides the threaded connection to the operating member end 18 within the associated threaded hole 32. A shank 46 extends from each connector head 44 to the threaded end 30 thereof and is received within the associated elastomeric tube 38 upon assembly. An axial surface 48 of an annular shape is provided on each connector 28 adjacent its threaded end 30 and is seated against the end 18 of operating member 16 about the associated threaded hole 32 thereof as the connector is torqued upon assembly.

A clamping plate 50 of the isolation package 22 is located between each connector head 44 and the elastomeric sleeve 36. Clamping plate 50 includes a flat plate portion 52 having a pair of holes 54 through which the shanks 46 of the connectors 28 extend. A pair of spaced flanges 56 of the clamping plate extend from the plate portion 52 thereof in a generally perpendicular relationship so as to define a generally U-shaped configuration that engages the three exposed sides of the elastomeric sleeve 36 whose other side is engaged with the upper end 18 of operating member 16 upon assembly. Thus, the sleeve 36 is essentially completely encircled to limit deformation thereof and thereby provide a more rigid connection between the lever 14 and the operating member 16.

As illustrated in FIG. 2, the lower end 20 of lever 14 has a flat shape and the sleeve 36 has a cross section of an elongated rectangular shape with longer side walls 58 and shorter end walls 60. The sleeve holes 40 are formed in the side walls 58 and have a size large enough to receive the ends 42 of the elastomeric tubes 38. Angular junctions 62 between the side and end walls 58 and 60 of sleeve 36 facilitate the insertion thereof within the U-shaped clamping plate 50 during assembly.

While the best mode for carrying out the invention has been described in detail, those familiar with the art to which this invention relates will recognize various alternative designs and embodiments for practicing the invention as defined by the following claims.

What is claimed is:

1. In a transmission shifter assembly including a shifter and a lever for operating the shifter, said shifter including an operating member that controls shifting of an associated transmission and has an upwardly projecting upper end, and said lever having a lower end for moving the upper end of the operating member of the shifter, an isolation package for connecting the upper end of the shifter operating member and the lower end of the lever, said isolation package comprising: a connector having a connection to one of said ends; the other end including a hole through which the connector extends to secure the lever and operating member ends to each other; and elastomeric material positioned between the lever and operating member ends and between the connector and said other end within the hole to provide a vibration isolated connection between the operating member and lever ends.

2. A shifter assembly as in claim 1 wherein the elastomeric material includes an elastomeric sleeve that receives said other end and has holes aligned with the hole in the other end, and the elastomeric material also including a tube that extends through the hole in said other end with the connector extending through the tube to connect the ends.

3. A shifter as in claim 2 wherein the elastomeric tube has opposite ends respectively received within the holes in the elastomeric sleeve.

4. A shifter assembly as in claim 2 wherein the connector includes a threaded end for providing the connection thereof in a threaded manner to the one end, the connector also including a head positioned on the opposite side of the elastomeric tube as the threaded end thereof, and a clamping plate located between the connector head and the elastomeric sleeve.

5. A shifter assembly as in claim 4 wherein the clamping plate includes a plate portion and a pair of spaced flanges extending from the plate portion in a perpendicular relationship to engage the elastomeric sleeve and limit deformation thereof as force is carried between the lever and the operating member.

6. A shifter assembly as in claim 5 which includes a pair of the connectors and a pair of the elastomeric tubes for connecting the shifter operating member and lever ends in cooperation with the elastomeric sleeve and the clamping plate.

7. A shifter assembly as in claim 1, 2, 3, 4, 5, or 6 wherein the end of the operating member has a hole for receiving the connector to provide connection thereof, and the lever end including the hole through which the connector extends with the elastomeric material positioned between the connector and this hole.

8. In a transmission shifter assembly including a shifter and a lever for operating the shifter, said shifter including an operating member that controls shifting of an associated transmission and has an upwardly projecting upper end, and said lever having a lower end for moving the upper end of the operating member of the shifter, an isolation package for connecting the upper end of the shifter operating member and the lower end of the lever, said isolation package comprising: a connector having a threaded connection to the upper end of the operating member; the connector having a head and a shank that extends between the head thereof and the threaded connection thereof to the upper end of the operating member; the lever end having a hole through which the shank of the connector extends to secure the lever and operating member ends to each other; elastomeric material positioned between the lever end and the operating member end and between the lever end and the head of the connector; and elastomeric material between the connector shank and lever end within the hole in the lever end, the elastomeric material cooperating with the connector to provide a vibration isolated connection between the operating member and lever ends.

9. In a transmission shifter assembly including a shifter and a lever for operating the shifter, said shifter including an operating member that controls shifting of an associated transmission and has an upwardly projecting upper end, and said lever having a lower end for moving the upper end of the operating member of the shifter, an isolation package for connecting the upper end of the shifter operating member and the lower end of the lever, said isolation package comprising: a connector having a threaded connection to the upper end of the operating member; the connector having a head and a shank that extends between the head thereof and the threaded connection thereof to the upper end of the operating member; the lever end having a hole through which the shank of the connector extends to secure the lever and operating member ends to each other; elastomeric material positioned between the lever end and the operating member end and between the lever end and the head of the connector; a clamping plate positioned between the connector head and elastomeric material; and an elastomeric tube that extends through the hole in the lever end with the connector shank extending through the elastomeric tube, the elastomeric material and tube cooperating with the connector and the clamping plate to provide a vibration isolated connection between the operating member and lever ends.

10. In a transmission shifter assembly including a shifter and a lever for operating the shifter, said shifter including an operating member that controls shifting of an associated transmission and has an upwardly projecting upper end, and said lever having a lower end for moving the upper end of the operating member of the shifter, an isolation package for connecting the upper end of the shifter operating member and the lower end of the lever, said isolation package comprising: a pair of connector bolts each of which has a threaded connection to the upper end of the operating member; each connector bolt having a head and a shank that extends between the head thereof and the threaded connection thereof to the upper end of the operating member; the lever end having a pair of holes through which the shanks of the pair of connector bolts respectively extend to secure the lever and operating member to each other; an elastomeric sleeve that receives the end of the lever and is positioned between the lever end and the end of the operating member; said sleeve having holes aligned with the holes in the lever and through which the shanks of the connector bolts extend; a clamping plate including a plate portion having a pair of holes through which the shanks of the connector bolts extend at a location between the connector bolt heads and the elastomeric sleeve; said clamping plate also including a pair of spaced flanges extending from the plate portion thereof in a perpendicular relationship to engage the elastomeric sleeve; a pair of elastomeric tubes that respectively extend through the holes in the lever end with the connector bolt shanks extending through the tubes; and the elastomeric tubes having opposite ends respectively received within the holes in the elastomeric sleeve, the elastomeric sleeve and tubes cooperating with the connector bolts and the clamping plate to provide a vibration isolated connection between the operating member and lever ends.

* * * * *